E. M. C. McALPINE.
MEASURING AND INDICATING DEVICE.
APPLICATION FILED APR. 18, 1917.
1,276,782.
Patented Aug. 27, 1918.
2 SHEETS—SHEET 1.
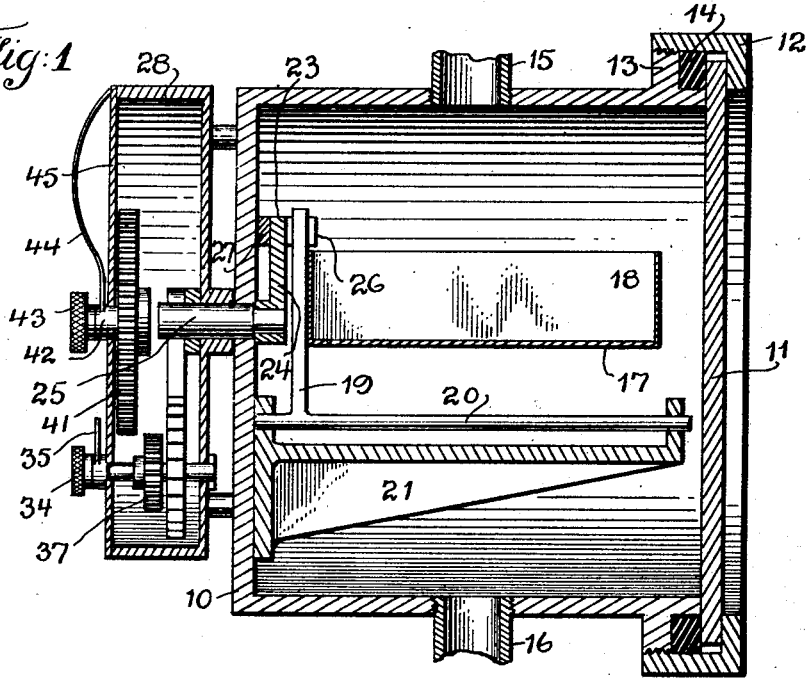
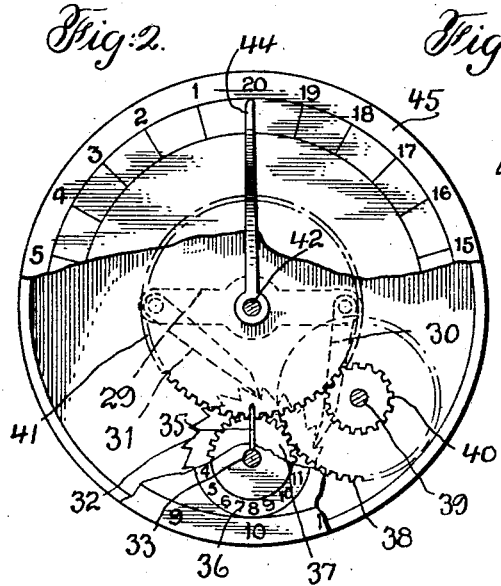
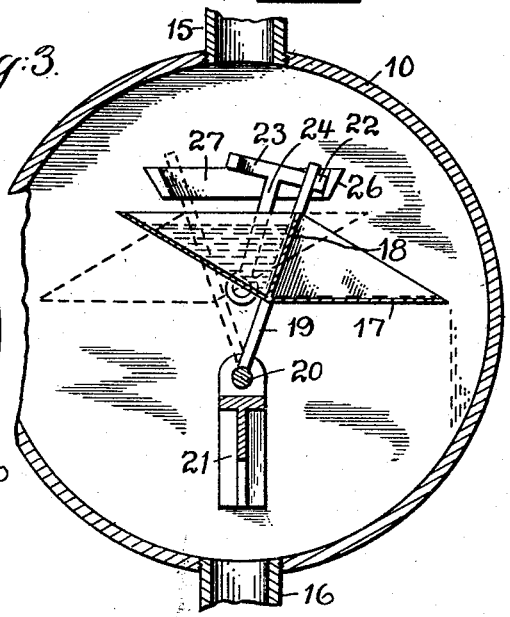
Edward M. C. McAlpine, Inventor,
By his Attorney,
W. P. Hutchinson E. M. C. McALPINE.
MEASURING AND INDICATING DEVICE.
APPLICATION FILED APR. 18, 1917.
1,276,782.
Patented Aug. 27, 1918.
2 SHEETS—SHEET 2.
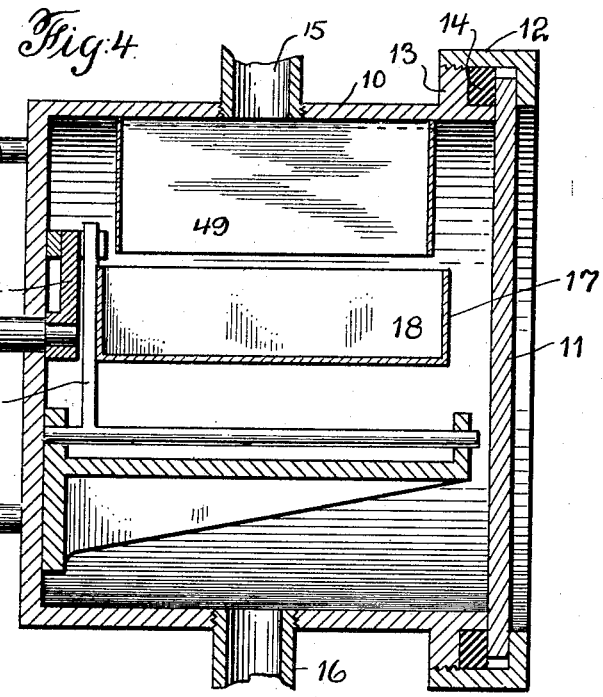
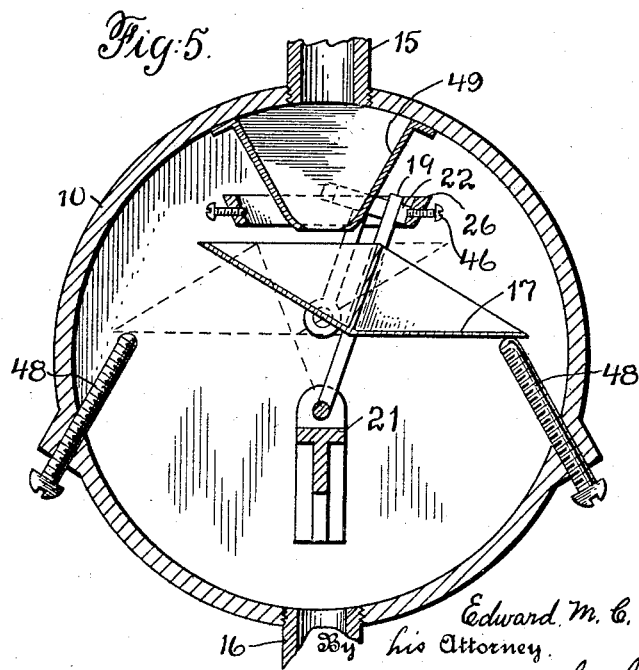
Inventor,
Edward M. C. McAlpine
By his Attorney
W. B. Hutchinson.

UNITED STATES PATENT OFFICE.

EDWARD M. C. McALPINE, OF NEW YORK, N. Y., ASSIGNOR TO McALPINE MILKING MACHINE COMPANY, OF CHATEAUGAY, NEW YORK, A FIRM CONSISTING OF EDWARD M. C. McALPINE, CLARENCE W. SPRAGUE, AND ROSCOE C. SPRAGUE, ALL OF CHATEAUGAY, NEW YORK.

MEASURING AND INDICATING DEVICE.

1,276,782.      Specification of Letters Patent.      Patented Aug. 27, 1918.

Application filed April 18, 1917. Serial No. 162,829.

*To all whom it may concern:*

Be it known that I, EDWARD M. C. McALPINE, a subject of the King of Great Britain, and a resident of the city, county, and State of New York, have invented a new and useful Improvement in Measuring and Indicating Devices, of which the following is a full, clear, and exact description.

My invention relates to improvements in apparatus for measuring flowing materials such as liquid, granular materials, or anything that will flow readily, and the object of my invention is to produce a very simple and reliable piece of apparatus which will accurately measure the material which flows through it, and will show on a suitable indicator the measurement. One use to which the apparatus is put is to measure the amount of milk given by a cow, and to produce an apparatus which can be used with certain types of milking machines to determine the amount of milk given at each milking by an individual animal. In some machines of this character the milk given by many cows flows through a pipe to a receiver, but there is no way of indicating just how much milk is given by each animal. My apparatus, however, is intended to determine this result without in the least interfering with the apparatus as a whole. It will be understood from the description which follows, however, that while the device is well adapted for this use, it can also be used for measuring other flowing materials, and my invention is intended to produce an apparatus which is so simple that it will not get out of order, so accurate that it is dependable, and in which the parts are easily reached and readily cleansed so that the device is unobjectionable from a sanitary point of view. All of which will be very clearly understood from the description which follows.

Reference is to be had to the accompanying drawings forming a part of this specification, in which similar reference characters indicate corresponding parts in all the views.

Figure 1 is a longitudinal section of the device embodying my invention.

Fig. 2 is a broken end or face view partly in section of the same,

Fig. 3 is a broken cross section,

Fig. 4 is a section similar to Fig. 1 but with parts removed showing a distributer to more evenly distribute the incoming material, and Fig. 5 is a cross section showing means for limiting the movement of the measuring vessel.

The apparatus is provided with a casing 10 which is preferably though not necessarily cylindrical, and at one end is a closure or cover 11 which is removable and which is held in place by a cap ring 12 screwing to the flange 13 on the exterior of the casing 10. A gasket 14 is preferably used between the flange 13 and the end or cover 11 to insure a tight joint. Obviously other means of attaching or detaching the end closure can be used without affecting the invention.

The casing has a suitable intake 15 at the top and an outlet 16 at the bottom. When applied to a milk machine, the pipe 15 would naturally connect with the pipe or trbe attached to the individual milking apparatus of the cow, and the pipe 16 would naturally connect with the receiver to which the milk of the several animals is delivered.

Beneath the intake 15 is an oscillating open topped receptacle or vessel 17, the bottom of which flares upward and outward and this is divided centrally and vertically by a partition 18.

The vessel 17 is rigidly attached to an arm 19 with which it oscillates, and the arm 19 extends upward from a shaft 20 to which it is rigidly attached, and of which it may form an integral part, this shaft 20 being pivoted as shown clearly in a bracket 21 secured to one end of the casing 10, although it may be otherwise suitably supported.

The arm 19 oscillates between the lugs 22 on the dog 23, and this has a downwardly extending arm 24 which is secured to a shaft 25, this being journaled in the end of the casing 10. It will thus be seen that the oscillation of the dog 23 will impart a similar movement to the shaft 25. The movement of the dog is limited by the lugs 26 on a fixed bracket 27 which is rigidly supported and can conveniently be attached to the end of the casing 10.

It will thus be seen that when the flowing material enters the intake pipe 15 it will drop into one of the compartments of the vessel 17 and will fill the compartment thus causing the vessel to swing to one side as shown clearly in Fig. 3, and the material will flow out over the edge and thence downward and outward through the pipe 16. This action will bring the second compartment of the vessel 17 beneath the intake, and when this is filled the vessel will tip to the other side, thus tipping backward and forward as long as the material flows. It will be seen further that each tilting action of the vessel will impart an oscillatory movement to the shaft 25. The shaft 25 extends into a gear casing 28 which is suitably supported at the end of the casing 10, and while any suitable closure for the gearing connecting with the indicator may be used, and in fact the gearing might be used without such inclosure, it is preferably inclosed in a casing. The shaft 25 carries a cross arm 29 which oscillates with the shaft, and on one side the shaft is a pawl 30 hanging in a generally vertical position and on the other side is a pawl 31 each being pivoted to the cross arm 29, and each engaging at different points the teeth of a ratchet wheel 32 which is secured to a shaft 33 mounted in the lower part of the gear casing 28. It will thus be seen that as the arm 29 oscillates, first one pawl 30 and then the other 31 will move the ratchet wheel 32 a distance of one tooth. The teeth are made to correspond with the indicator operated thereby, and the shaft carries a hand 35 which moves over a dial 36 which in the present instance is made to indicate ounces, but which can of course represent any unit of measurement. The shaft 33 has preferably a milled wheel 34 at the outer end by which it can be turned back by hand if desired.

The shaft 33 carries a pinion 37 meshing with a gear wheel 38 on the shaft 39 (see Fig. 2) which is also journaled in the gear casing 28, and the shaft 39 carries a pinion 40 which drives a gear wheel 41 on the shaft 42, this being journaled centrally in the dial plate 45 on the outer end of the gear case 28. The shaft 42 is also preferably provided with a milled wheel 43 at its outer side and it carries a hand 44 moving over the dial plate 45 which can represent any unit of measurement, but which in the present instance indicates pounds. The several gear wheels are proportioned as to size so that when the shaft 33 is moved a complete revolution, thus indicating sixteen ounces on the dial 36, the shaft 42 will move only a sufficient distance to carry the hand 44 the distance of one space over the dial 45, thus indicating a pound.

It will be clearly evident, however, that this invention is not dependent on any particular train of gearing for working the indicator, that the gearing can be changed to suit different units of measurement, and that so far as this invention is concerned the important thing is to have a suitable indicator operated by the oscillation of the shaft 25 and of the vessel 17.

For making more accurate measurements it is desirable to have some sort of baffle or distributer which will prevent the incoming material from dropping too suddenly and in one spot into the vessel 17. A convenient form of this is shown in Figs. 4 and 5 where the converging baffles 49 leave an opening between them at the bottom so that the incoming material is distributed more evenly in the vessel 17, and its force in dropping is somewhat lessened.

I have also found it desirable to have means which may be adjusted for regulating the oscillation of the vessel 17 or of the dog 23, as this is conducive to greater accuracy. This can be effected in several ways, as for instance by the screws 46 which extend through the lugs 26 and thus limit the movement of the dog 23 by serving as abutments for the lugs 22, or screws 48 may be extended through the lower side portions of the casing 10 and into the path of the vessel 17 so that by adjusting the screws the throw of the vessel, and consequently the amount of material carried by it, can be regulated.

From the foregoing description it will be readily seen that the material flowing through the casing 10 will by reason of the oscillation of the vessel 17 impart movement to the indicator so as to clearly indicate the amount of such flowing material, and in this connection attention is called to the fact that each compartment of the vessel 17 should hold a given unit of measurement, which in the present instance is an ounce, but which can of course be varied to suit various materials and various units of measurement.

It will be clear also that many of the details of construction can be changed without affecting the invention.

The mechanism for working the indicator which I have shown is simple and answers the purpose, and it will be seen that by taking hold of the milled wheel 43 or 34 the gearing can at any time be turned back to bring the hands 35 and 44 to the desired point.

I claim:—

1. An apparatus of the kind described comprising an inclosing casing having an inlet at the top and a suitable outlet, a shaft journaled in one end of the casing, an indicator connected with and operated by the shaft, an oscillating vessel located beneath the inlet and divided longitudinally to form two similar compartments, a dog carried by the aforesaid shaft, an oscillating arm serving as a support for the vessel, and a connection between the arm and the dog whereby the oscillations of the vessel and arm are communicated to the dog.

2. An apparatus of the kind described comprising an inclosing casing having an inlet at the top and a suitable outlet, a shaft journaled in one end of the casing, an indicator connected with and operated by the shaft, an oscillating vessel arranged below the inlet and divided longitudinally to form two similar compartments, an oscillating arm secured to the vessel and serving as a support for the same, said arm extending above and below the vessel, a dog secured to the aforesaid shaft, and a connection between the upper part of the arm and the dog whereby the oscillations of the arm are communicated to the dog.

3. An apparatus of the kind described comprising an inclosing casing having an inlet at the top and a suitable outlet, a shaft in the end of the casing, an indicator operated by the shaft, a dog secured to the shaft and provided with lugs spaced apart, an oscillating arm pivotally supported in the casing and tilting between the lugs of the dog, a vessel carried by the arm and divided longitudinally to form two similar compartments, and abutments to limit the movement of the dog and vessel.

4. An apparatus of the kind described comprising an inclosing casing having an inlet at the top and a suitable outlet, a shaft journaled in the casing, an upwardly extending arm on the shaft, a vessel carried by and oscillating with the arm, said vessel being located beneath the aforesaid inlet and divided longitudinally to form two similar compartments, a second shaft journaled in the end of the casing, an indicator operated by the shaft, a dog secured to the shaft and having lugs spaced apart and arranged in the path of the aforesaid arm, and means for limiting the movement of the dog.

EDWARD M. C. McALPINE.

Witnesses:
WARREN B. HUTCHINSON,
M. S. O'DONNELL.

Copies of this patent may be obtained for five cents each, by addressing the "Commissioner of Patents, Washington, D. C."